(12) United States Patent
Rong et al.

(10) Patent No.: US 9,443,137 B2
(45) Date of Patent: Sep. 13, 2016

(54) APPARATUS AND METHOD FOR DETECTING BODY PARTS

(71) Applicant: SAMSUNG ELECTRONICS CO., LTD., Suwon (KR)

(72) Inventors: Liu Rong, Beijing (CN); Zhang Fan, Beijing (CN); Chen Maolin, Beijing (CN); Chang Kyu Choi, Seongnam (KR); Ji Yeun Kim, Seoul (KR); Kee Chang Lee, Yongin (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 575 days.

(21) Appl. No.: 13/857,623

(22) Filed: Apr. 5, 2013

(65) Prior Publication Data

US 2013/0301911 A1 Nov. 14, 2013

(30) Foreign Application Priority Data

May 8, 2012 (CN) .......................... 2012 1 0141357
Nov. 21, 2012 (KR) ........................ 10-2012-0132388

(51) Int. Cl.
*G06K 9/00* (2006.01)

(52) U.S. Cl.
CPC ................................. *G06K 9/00369* (2013.01)

(58) Field of Classification Search
None
See application file for complete search history.

(56) References Cited

U.S. PATENT DOCUMENTS

| | | | | |
|---|---|---|---|---|
| 7,728,839 B2* | 6/2010 | Yang | ..................... | A61B 5/1038 345/474 |
| 2006/0126938 A1 | 6/2006 | Lee et al. | | |
| 2007/0223790 A1 | 9/2007 | Xiao et al. | | |
| 2008/0170123 A1 | 7/2008 | Albertson et al. | | |
| 2008/0304714 A1 | 12/2008 | Lu et al. | | |
| 2009/0041357 A1* | 2/2009 | Yonezawa | .......... | G06K 9/00248 382/195 |
| 2009/0226044 A1 | 9/2009 | Ngan et al. | | |
| 2010/0158354 A1 | 6/2010 | Kim et al. | | |
| 2010/0209000 A1* | 8/2010 | Usui | ..................... | G06K 9/621 382/195 |
| 2010/0215271 A1 | 8/2010 | Dariush et al. | | |
| 2011/0025834 A1 | 2/2011 | Chen et al. | | |
| 2011/0044506 A1 | 2/2011 | Chen | | |
| 2011/0305392 A1* | 12/2011 | Kapoor | ................ | G06K 9/6228 382/174 |
| 2012/0070070 A1 | 3/2012 | Litvak | | |
| 2012/0089545 A1* | 4/2012 | Mei | ....................... | G06K 9/6257 706/20 |

(Continued)

FOREIGN PATENT DOCUMENTS

| | | |
|---|---|---|
| KR | 10-2004-0079637 | 9/2004 |
| KR | 10-2009-0049438 | 5/2009 |

(Continued)

OTHER PUBLICATIONS

Lin, Z.—"Multiple Instance Feature for Robust Part-based Object Detection" —IEEE 2009; pp. 405-412.*

(Continued)

*Primary Examiner* — Bernard Krasnic
(74) *Attorney, Agent, or Firm* — NSIP Law

(57) ABSTRACT

Provided is an apparatus and method for detecting body parts, the method including identifying a group of sub-images relevant to a body part in an image to be detected, assigning a reliability coefficient for the body part to the sub-images in the group of sub-images based on a basic vision feature of the sub-images and an extension feature of the sub-images to neighboring regions, and detecting a location of the body part by overlaying sub-images having reliability coefficients higher than a threshold value.

17 Claims, 4 Drawing Sheets

(56) References Cited

U.S. PATENT DOCUMENTS

2012/0093407 A1* 4/2012 Mei .................. G06K 9/72
 382/170
2012/0269384 A1* 10/2012 Jones ............. G06K 9/00201
 382/103

FOREIGN PATENT DOCUMENTS

| KR | 10-2011-0019969 | 3/2011 |
|---|---|---|
| KR | 10-2011-0026214 | 3/2011 |
| KR | 10-2011-0032846 | 3/2011 |

OTHER PUBLICATIONS

Ye, Q.—"Fast Pedestrian Detection with Multi-Scale Orientation Features and Two Stage Classifiers" —2010 IEEE, pp. 881-884.*

* cited by examiner

APPARATUS AND METHOD FOR DETECTING BODY PARTS

CROSS-REFERENCE TO RELATED APPLICATIONS

This application is related to, and claims the priority to, Chinese Patent Application No. 201210141357.2, filed on May 8, 2012, in the Chinese Patent Office and Korean Patent Application No. 10-2012-0132388, filed on Nov. 21, 2012, in the Korean Intellectual Property Office, the disclosures of which are incorporated herein by reference.

BACKGROUND

1. Field

One or more embodiments of the present disclosure relate to computer vision and mode identification technologies, and more particularly, to an apparatus and method for detecting body parts based on a multi-part context descriptor.

2. Description of the Related Art

Body pose estimation is a basic task in computer vision with a wide range of applications in various fields including, for example, human-machine interaction, games, movies, virtual reality role-playing animations, three-dimensional (3D), and the like. By virtue of its technical and commercial value, body pose estimation is gaining attention recently. In particular, body part detection plays an important role in the body pose estimation. The body part detection provides observation data necessary for estimating the pose of the human body.

Body part detection includes two types of approaches: object-based body part detection and pixel-based body part detection. The object-based body part detection considers each pixel in an object region as a positive sample, and uses the relationship with a pixel in the object region and a neighboring pixel as a feature descriptor. The pixel-based body part detection considers an overall object region as a positive sample and describes the object region using some features. While the pixel-based body part detection uses neighborhood information of an object to detect the object, rather than an internal feature and a contour feature of the object, the object-based body part detection uses an internal feature and a contour feature of an object rather than neighborhood information of the object.

To improve accuracy of body part detection, there is a demand for an apparatus and method for detecting body parts using a combination of an object-based approach and a pixel-based approach.

SUMMARY

The foregoing and/or other aspects are achieved by providing a method of detecting body parts, the method including identifying a group of sub-images relevant to a body part in an image to be detected, assigning a reliability coefficient for the body part to the sub-images in the group of sub-images based on a basic vision feature of the sub-images and an extension feature of the sub-images to neighboring regions, and detecting a location of the body part by overlaying sub-images having reliability coefficients higher than a threshold value.

The assigning of the reliability coefficient for the body part to the sub-images belonging to the group of sub-images may include defining the multi-part context descriptor for the sub-images, the multi-part context descriptor including a basic descriptor and an extension descriptor, and assigning of the reliability coefficient to the sub-images based on similarity between the multi-part context descriptor for the sub-images and the trained multi-part context descriptor for the body part. The basic descriptor may describe the basic vision feature of the body part in the sub-images, and the extension descriptor may describe a spatial structural relationship between the body part in the sub-images and the neighboring regions of the body part.

The sub-images may correspond to image regions having different geometries, locations, sizes among the image to be detected.

The plurality of sub-images in the group may overlap each other.

The method may further include preprocessing the image to be detected before identifying the image.

The preprocessing may include at least one of quantizing data of the image to be detected, measuring image 3D information or image depth information of the image to be detected, segmenting the image to be detected, and extracting a foreground from the image to be detected.

The basic vision feature may include at least one of an ordinal feature, a binary feature, a Haar-like feature, a histogram of oriented gradients (HOG) feature, a contour feature, and a grayscale histogram feature.

The overlaying of the sub-images may include one of a direct overlay and a weighted overlay, and the threshold value may be different based on a type of the multi-part context descriptor selected and combinations of multi-part context descriptors.

The direct overlay may include selecting sub-images having reliability coefficients higher than a predetermined value, and merging locations of the selected sub-images using statistic and geometric algorithms.

The weighted overlay may include merging locations of the sub-images based on different reliability coefficient threshold values or a clustering algorithm.

The foregoing and/or other aspects are also achieved by providing an apparatus for detecting body parts, the apparatus including a sub-image identification unit configured to identify a group of sub-images relevant to a body part in an image to be detected, and a body part identification unit configured to detect a location of the body part by assigning a reliability coefficient for the body part to the sub-images in the group of sub-images based on a basic vision feature of the sub-images and an extension feature of the sub-images to neighboring regions, and by overlaying sub-images having reliability coefficients higher than a threshold value.

The apparatus may further include a training unit configured to train a sample image to acquire a multi-part context descriptor for the body part. The multi-part context descriptor may include a basic descriptor and an extension descriptor, the basic descriptor may describe the basic vision feature of the body part in the sub-images, and the extension descriptor may describe a spatial structural relationship between the body part in the sub-images and the neighboring regions of the body part. The body part identification unit may be configured to define the multi-part context descriptor for the sub-images, and to assign the reliability coefficient to the sub-images based on similarity between the multi-part context descriptor for the sub-images and the trained multi-part context descriptor for the body part.

The apparatus may further include a preprocessing unit configured to preprocess an image to be detected or a sample image.

The foregoing and/or other aspects are also achieved by providing body part detecting system. The body part detecting system includes an image acquisition apparatus configured to acquire image data of an image to be detected and a body part detection apparatus, which includes a sub-image identification unit configured to identify a group of sub-images relevant to a body part in the image acquired by the image acquisition apparatus, and a body part identification unit configured to detect a location of the body part by assigning a reliability coefficient for the body part to the sub-images in the group of sub-images based on a basic vision feature of the sub-images and an extension feature of the sub-images to neighboring regions, and by overlaying sub-images having reliability coefficients higher than a threshold value.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
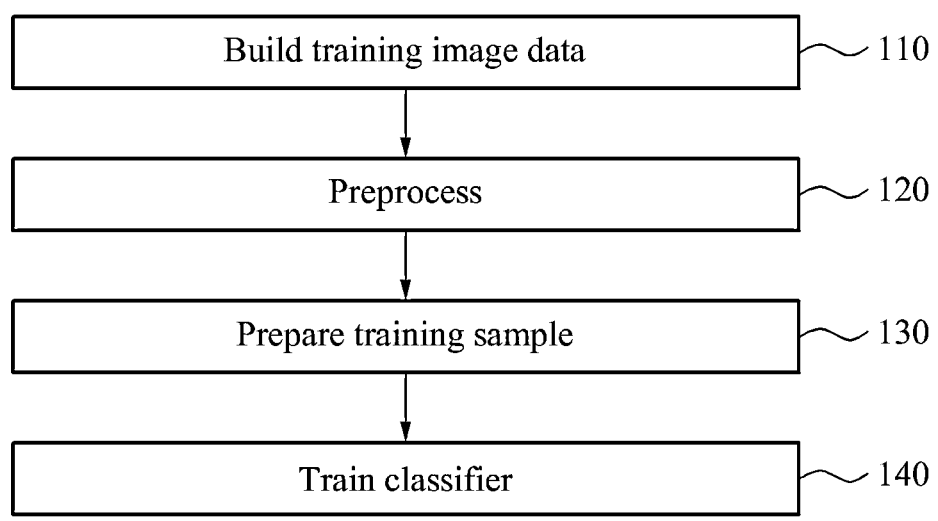
FIG. 1 is a flowchart illustrating a training process of a method for detecting body parts according to an exemplary embodiment.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 is a flowchart illustrating a training process of a method for detecting body parts according to an exemplary embodiment.

Referring to FIG. 1, the training process of the method for detecting body parts according to an exemplary embodiment may include, for example, an operation 110 of training image data construction, an operation 120 of preprocessing, an operation 130 of training sample preparation, and an operation 140 of body part classifier training. Hereinafter, a further detailed description is provided.

In the operation 110 of training image data construction, training image data may be constructed using integration of image data or real image data.

In the operation 120 of preprocessing, quantization and background removal may be performed on the training image data. Quantization may refer to processing of original image data into quantized depth image data for subsequent processing. For example, a grayscale image is a representative example of a quantized depth image, in which image data values are quantized in a range between 0 and 255. The quantization may allow noise removal from original image data and reduction in a needed amount of computation. The background removal may involve depth value restriction, relative region extraction, and motion capture.

The operation 120 of preprocessing may include at least one operation selected from among an operation of quantizing the training image data, an operation of measuring image 3D information or image depth information of the training image data, an operation of segmenting the training image data, and an operation of extracting a foreground from the training image data.

In the operation 130 of training sample preparation, three types of training samples may be prepared. The training samples may include a part sample, a part context sample, and a negative sample. The part sample may focus on a body part. The part context sample may focus on a neighboring region of the body part. Neighboring region segmentation may be represented by $S_s(C_x,C_y,R,M)$, wherein $C_x$, $C_y$ denote a location of the center of the neighboring region, R denotes a size of the neighboring region, and M denotes a segmented shape of the neighboring region. The segmented shape of the neighboring region may include a rectangle, a circle, and the like. The negative sample may correspond to a sub-image including a body part to be detected and a sub-image opposite to the sub-image including the body part. The opposite sub-image may refer to a sub-image absent or lacking a body part to be detected. Generally, two types of negative samples may be used in the sample training. The negative samples may include a background image absent a human body, and a body image including an extracted body part. Whether a body part to be detected is present in a sub-image may be determined through training the negative sample.

In the operation 140 of body part classifier training, a body part classifier for body part detection may be trained. The operation 140 of classifier training may include sample description, training enhancement, and building of a body part detector.

In the sample description, a sample may be described based on a basic feature of a sub-image and an extension feature of the sub-image to a neighboring region. The basic feature and the extension feature of the sub-image may be described using a multi-part context descriptor according to an exemplary embodiment. The multi-part context descriptor may be used to describe a basic vision feature of a sub-image on a body part and an extension feature of the sub-image to a neighboring region, namely, contextual information of the neighboring region near the body part. For example, a basic feature of the multi-part context descriptor may be defined using a feature of a multi-size ordinal mode (MSOP).

An MSOP mode-based multi-part context descriptor may be represented by Equation 1 below:

$$f_\theta = \sum_{i=1}^{g} b(g_i - g_c) \cdot 2^{i-1}$$ [Equation 1]

where $b(x)$ denotes a Boolean function, when $x>0$, $b(x)=1$, and when $x<0$, $b(x)=0$. In an MSOP mode, $g_i$ denotes a pixel value in a grid, namely, a sub-image, 'i' denotes an index of the grid, $g_c$ denotes an average pixel value in grids of a sub-image and a neighboring region of the sub-image, and may be represented by $g_c=\sum_{i=1}^{8}g_i/8$. 'θ' denotes a parameter of the MSOP mode, and the parameter of the MSOP mode may include a location, a size, and a type of the mode. The MSOP mode may encompass an MSOP mode for describing a basic feature of a body part included in a sub-image and an MSOP mode for describing an extension feature to a neighboring region. The MSOP mode-based context descriptor may include, but is not limited to, a multi-part context descriptor according to an exemplary embodiment. As the multi-part context descriptor, other context descriptors used in computer vision may be available, for example, a Haar-like feature, a histogram of oriented gradients (HOG) feature, a binary feature, a contour feature, and a grayscale histogram feature.

Hereinafter, a mode of a multi-part context descriptor is described in further detail with reference to FIG. 2.

Figure 2:
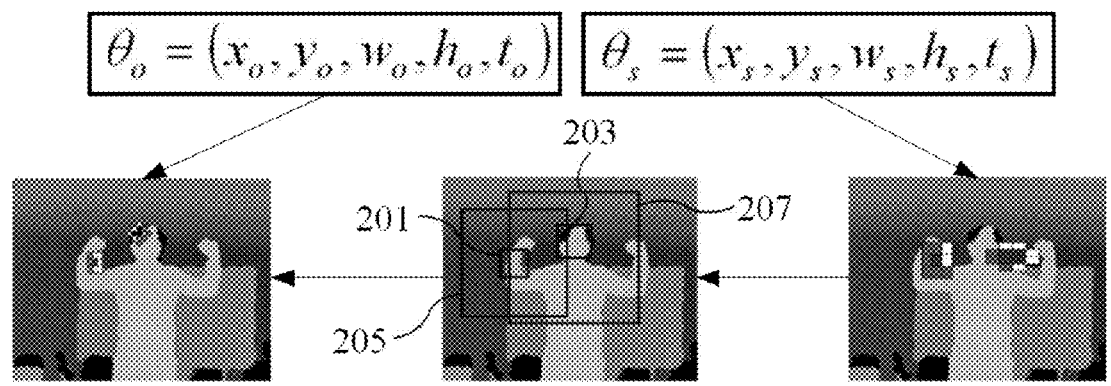
FIG. 2 illustrates a multi-part context descriptor in a depth image according to an exemplary embodiment.

FIG. 2 illustrates a mode parameter of a multi-part context descriptor according to an exemplary embodiment.

Referring to FIG. 2, blocks 201 and 203 refer to a sub-image including a body part. A body part included in a block 201 corresponds to an upper arm, and a body part included in a block 203 corresponds to a head. Blocks 205 and 207 refer to neighboring regions of the blocks 201 and 203, respectively. $\theta_o=(x_o,y_o,w_o,h_o,t_o)$ represents a mode parameter of a basic descriptor in the multi-part context descriptor, and may be used to describe a vision feature of a body part. $\theta_s=(x_s,y_s,w_s,h_s,t_s)$ represents a mode parameter of an extension descriptor in the multi-part context descriptor, and may be used to describe contextual information of a neighboring region near the body part. Here, 'x' and 'y' denote location parameters of the descriptor, 'w' and 'h' denote shape parameters of the descriptor, and 't' denotes a type of the descriptor. In the feature description, a size and a shape of a neighboring region may be defined to have a predetermined relationship with a sub-image including a body part to be detected. The neighboring region may correspond to a larger region sufficient to cover the sub-image region similar to blocks 205 and 207. The neighboring region may correspond to, for example, an upper region, a lower region, a left region, and a right region of the sub-image region. The size of the neighboring region may be any size greater than that of the sub-image region such as twice, three times, or 3.5 times as large as the sub-image region. The shape of the neighboring region may be the same as that of the sub-image, and may include, for example, a fixed rectangle, a circle, and the like.

When the multi-part context descriptor describes a head, the multi-part context descriptor may describe a feature of the head, for example, a contour feature of an oval, and information associated with a neck or shoulders near the head as well. When the multi-part context descriptor describes an upper arm, the multi-part context descriptor may describe a shape of the upper arm and information associated with an upper body near the upper arm as well. Accordingly, the multi-part context descriptor according to an exemplary embodiment may encompass an internal feature and a contour configuration of a body part and context information of a neighboring region of the body part as well. Hereby, the multi-part context descriptor according to an exemplary embodiment may provide improved stability.

Although this exemplary embodiment shows a head and an upper arm, it would be obvious to a person having ordinary skill in the art that the multi-part context descriptor may be applied to any part of the whole body, for example, a head, a left upper arm, a left lower arm, a left hand, a right upper arm, a right lower arm, a right hand, a left thigh, a left calf, a right thigh, and a right calf, and the like. For each body part, more accurate training of the multi-part context descriptor may be executed.

Referring to FIG. 1, training enhancement may involve training a set of classifiers to detect the body part, each classifier being a feature of a sub-image. The classifier training may be executed using an algorithm, such as, for example, support vector machine (SVM), forest, boosting, and the like. When the classifier training is executed using an AdaBoost algorithm, the AdaBoost-based multi-part context descriptor may be given by Equation 2 below:

$$F(x)=\Sigma_{t=1}^{T_o}f_{o,t}(x)+\Sigma_{t=1}^{T_s}f_{s,t}(x) \qquad \text{[Equation 2]}$$

where 'x' denotes a sample, $f_{o,t}(x)$ denotes a classifier used to describe a feature of a body part, $f_{s,t}(x)$ denotes a classifier used to describe contextual information of a neighboring region of the body part, $T_o$ denotes a number of $f_{o,t}(x)$ classifiers, $T_s$ denotes a number of $f_{s,t}(x)$ classifiers, and F(x) denotes a final classifier.

In the construction of the body part detector, the trained set of classifiers may be cascaded to improve the performance of body part detection.

Hereinafter, a method of detecting body parts according to an exemplary embodiment is described with reference to FIG. 3.

Figure 3:
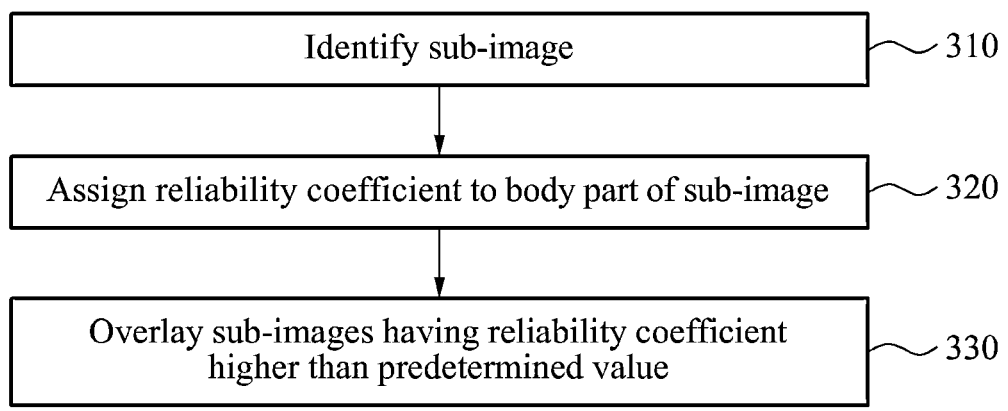
FIG. 3 is a flowchart illustrating a method of detecting body parts according to an exemplary embodiment.

Referring to FIG. 3, in operation 310, a group of sub-images relevant to a body part in an image to be detected may be identified. A sub-image may be searched for based on predetermined location and size of a depth image, and determination may be made as to whether the found sub-image corresponds to a body part to be detected.

The search may be represented by Search($S_{min}$,$S_{max}$,$S_{step}$, $P_{start}$,$P_{end}$,$P_s$), where $S_{min}$,$S_{max}$,$S_{step}$ denote a smallest size, a largest size, and a step size used in the sub-image search, respectively, and $P_{start}$,$P_{end}$,$P_s$ denote an initial start point, an end point, and a searching step size used in the sub-image search, respectively. The sub-images may correspond to image regions having different geometries, locations, sizes among the image to be detected. The plurality of sub-images in the group may overlap each other. The search may be conducted iteratively, and may be used to extract the sub-image regions. To extract the sub-image regions, a size of a sub-image may be determined based on the initial size $S_{min}$, a center of a sub-image region may be determined with respect to the initial start point $P_{start}$, the center may be moved by the step size $P_s$ to the end point $P_{end}$, in a sequential order, and a sub-image may be extracted at each location along the traverse to the end point $P_{end}$. The extracted sub-images may be enlarged to the largest size $S_{max}$ by the step size $S_{step}$ in a sequential order. The search may be conducted throughout the sub-images once per sub-image region, with the center of the sub-image moving from the initial start point $P_{start}$ to the end point $P_{end}$.

The body part may be extracted from the image to be detected through foreground extraction. Since only a foreground is extracted, the body part may be only detected in a foreground, resulting in reduced amount of sub-image search. Also, since a depth value of the body part is measured using the extracted foreground body part, a sub-image search range may be reduced. The sub-images may be identified using image 3D information and image segmentation.

In operation 320, a reliability coefficient for the body part may be assigned to each sub-image in the group of sub-images based on a basic feature of the sub-images and an extension feature of the sub-images to neighboring regions. Based on the trained multi-part context descriptor, whether the sub-image corresponds to the body part may be determined. The reliability coefficient of the sub-images may be calculated using a final classifier F(x) represented by Equation 2, obtained by training the body part classifiers. The reliability coefficient may correspond to an output value obtained by overlaying the trained data of the classifiers f based on F(x).

In operation 330, sub-images having reliability coefficients higher than a threshold value may be overlaid, and the location of the body part may be detected based on the overlaid sub-images. The threshold value may be different based on a type of the multi-part context descriptor selected and combinations of multi-part context descriptors. The overlay of the sub-images may include a direct overlay and a weighted overlay. According to the direct overlay, the location of the body part may be detected by selecting sub-images having reliability coefficients higher than a predetermined value and by merging the locations of the selected sub-images using statistic and geometric algorithms. A mean center location and a mean size of the sub-images satisfying the reliability coefficient requirement may be calculated, and may used to determine the final location of the body part. A region in which the sub-images satisfying the reliability coefficient requirement are concentrated may be determined to be a final output location of the body part.

According to the weighted overlay, locations of the sub-images may be merged based on different reliability coefficient threshold values or a clustering algorithm. The clustering algorithm may include a mean shift clustering algorithm and a k-nearest neighbor clustering algorithm. During the weighted overlay, the reliability coefficients of all the sub-images satisfying the reliability coefficient requirement may be maintained, and an importance of the sub-images may be determined based on the reliability coefficient for each respective sub-image. A weighted mean center location and a weighted mean size of the sub-images may be calculated based on the determined importance, and may be used to determine the final location of the body part.

Figure 4:
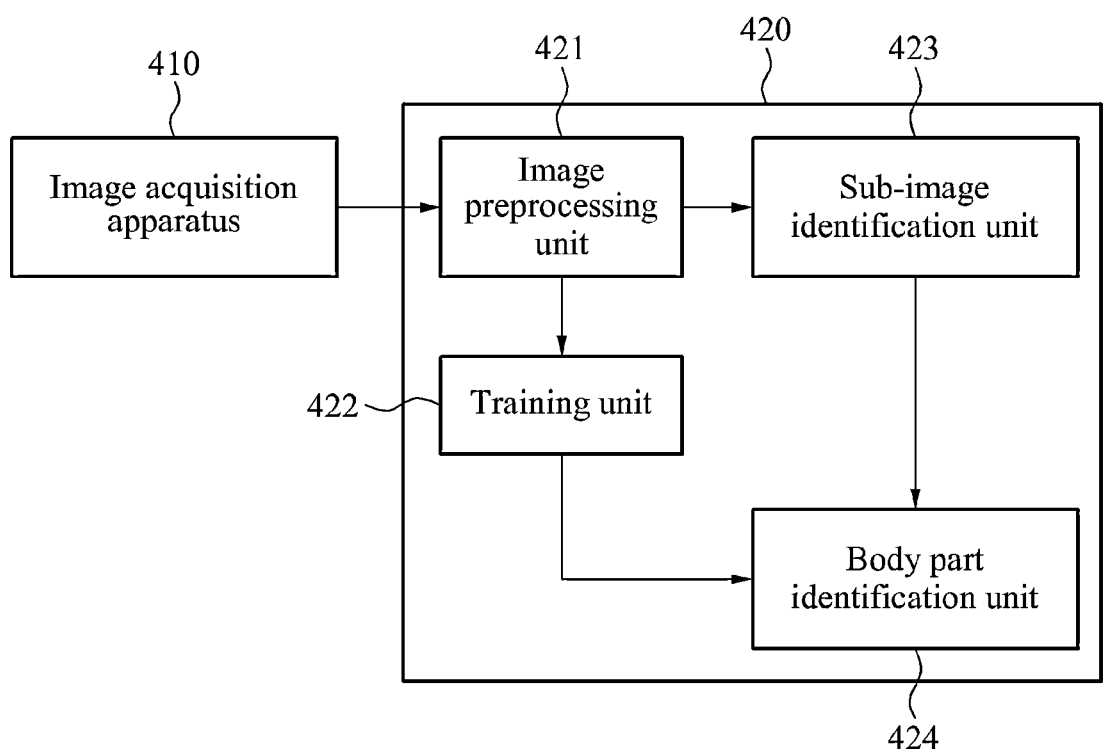
FIG. 4 illustrates a system for detecting body parts according to an exemplary embodiment.

Hereinafter, an operating principle of a system for detecting body parts according to an exemplary embodiment is described with reference to FIG. 4. Referring to FIG. 4, the system may include an image acquisition apparatus 410 and a body part detection apparatus 420. Although this exemplary embodiment shows that the image acquisition apparatus 410 and the body part detection apparatus 420 are provided separately, the image acquisition apparatus 410 and the body part detection apparatus 420 may be implemented as a single apparatus.

The image acquisition apparatus 410 may be used to acquire image data. The image acquisition apparatus 410 may include, for example, a PrimeSense mapping device, a time-of-flight (ToF) camera, a multi-view camera, and the like. The image data acquired by the image acquisition apparatus 410 may be used as training image data and image data to be detected.

The body part detection apparatus 420 may include, for example, an image preprocessing unit 421, a training unit 422, a sub-image identification unit 423, and a body part identification unit 424.

The image preprocessing unit 421 may preprocess the image data. The image preprocessing unit 421 may preprocess the image data acquired by the image acquisition apparatus 410 or sample image data stored in a training sample image database. The image preprocessing unit 421 may quantize the image data, and may perform foreground extraction, depth value measurement, image 3D information measurement, and image segmentation on the image data for subsequent processing of the training unit 422 and the sub-image identification unit 423.

The training unit 422 may prepare training samples from the training sample image data, may train body part classifiers or a multi-part context descriptor using the prepared training samples, and may build a body part detector using the trained classifiers. The training sample image data may correspond to image data stored in an image database or image data acquired by the image acquisition apparatus 410.

The sub-image identification unit 423 may identify a group of sub-images relevant to the body part in the image to be detected.

The body part identification unit 424 may assign a reliability coefficient for the body part to each sub-image in the group of sub-images based on a basic vision feature of the sub-images and an extension feature of the sub-images to neighboring regions. The body part identification unit 424 may detect a location of the body part by overlaying sub-images having reliability coefficients higher than a threshold value. The body part identification unit 424 may define the multi-part context descriptor for each sub-image, and may assign the reliability coefficient to each sub-image based on similarity between the multi-part context descriptor for each sub-image and the trained multi-part context descriptor for the body part. The body part identification unit 424 may output the detected result to an external device, and may display the body part identified by the external device.

The configuration of the body part detecting apparatus 420 disclosed in the foregoing is exemplary, and the body part detection apparatus 420 may include a larger or smaller number of modules. The modules of the body part detection apparatus 420 may be split or combined.

According to the exemplary embodiments, the multi-part context descriptor may describe an internal feature and a contour feature of a body part and contextual information of a neighboring region near the body part as well. Accordingly, using the contextual information of the neighboring region, the performance of the body part detector may be improved, fast classifier training may be achieved, and complexity of classification may be reduced. As a result, the performance of body part detection may be improved efficiently.

The body part detecting methods according to the above-described embodiments may be recorded in non-transitory computer-readable media including program instructions to implement various operations embodied by a computer or a processor. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer or processor using an interpreter. The described hardware devices or units may be configured to act as one or more software modules in order to perform the operations of the above-described embodiments, or vice versa. Any one or more of the software modules described herein may be executed by a controller such as a dedicated processor unique to that unit or by a processor common to one or more of the modules. The described methods may be executed on a general purpose computer or processor or may be executed on a particular machine such as the apparatusses described herein.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A body part detecting method, comprising:
generating a plurality of sub-images based on an input image comprising body parts;
determining, by way of a processor, a reliability coefficient for the sub-images based on a basic feature of the sub-images and an extension feature of the sub-images to neighboring regions;
detecting the body parts based on the determined reliability coefficient for the sub-images, wherein when it is determined that at least two of the sub-images have reliability coefficients higher than a threshold value among the sub-images, detecting the body parts by clustering is performed; and
overlaying the sub-images by one of a direct overlay and a weighted overlay, wherein the threshold value is different based on a type of a multi-part context descriptor selected and combinations of multi-part context descriptors,
wherein the determining comprises determining the reliability coefficient for the sub-images based on a similarity between the multi-part context descriptor for the sub-images and a preset multi-part context descriptor for the body parts, and
wherein the multi-part context descriptor comprises a basic descriptor corresponding to the basic feature and an extension descriptor corresponding to the extension feature.

2. The method of claim 1, wherein the basic descriptor describes the basic feature of the body parts in the sub-images and the extension descriptor describes a spatial structural relationship between the body parts in the sub-images and the neighboring regions of the body parts.

3. The method of claim 1, further comprising:
preprocessing the input image.

4. The method of claim 3, wherein the preprocessing comprises:
detecting three-dimensional (3D) information or depth information of the input image; and
extracting a foreground from the input image based on the 3D information or the depth information.

5. The method of claim 1, wherein the basic feature comprises at least one of an ordinal feature, a binary feature, a Haar-like feature, a histogram of oriented gradients (HOG) feature, a contour feature, and a grayscale histogram feature.

6. The method of claim 1, wherein the direct overlay scheme comprises:
selecting sub-images having reliability coefficients higher than a predetermined value; and
merging the selected sub-images using at least one of statistics and geometric algorithms.

7. The method of claim 1, wherein the weighted overlay scheme comprises merging the sub-images based on different reliability coefficient threshold values or a clustering algorithm.

8. The method of claim 1, further comprising calculating a mean center location and a mean center size of the sub-images having the reliability coefficient requirement higher than the threshold value and using at least one of the mean center location and the mean center size to determine a final location of the body parts.

9. The method of claim 8, further comprising weighting the mean center location and the mean center size based on a respective reliability coefficient to determine the final location of the body parts.

10. The method of claim 1, wherein the reliability coefficient of the sub-images may be calculated using a final classifier obtained by training a plurality of body part classifiers.

11. A non-transitory computer-readable storage medium encoded with computer readable code comprising a program for implementing the method of claim 1.

12. The method of claim 1, wherein the extension feature comprises multi-size ordinal pattern (MSOP) feature based on a parameter indicating the neighboring regions.

13. The method of claim 1, wherein the threshold value is different based on a combination of at least one basic descriptor and at least one extension descriptor included in the multi-part context descriptor.

14. A body part detecting apparatus, comprising:
a processor; and
a memory,
wherein the processor is configured to:
generate a plurality of sub-images based on an input image comprising body parts,
determine a reliability coefficient for the sub-images based on a basic feature of the sub-images and an extension feature of the sub-images to neighboring regions;
detecting the body parts based on the determined reliability coefficient for the sub-images, wherein when it is determined that at least two of the sub-images have reliability coefficients higher than a threshold value among the sub-images, detecting the body parts by clustering is performed; and
overlaying the sub-images by one of a direct overlay and a weighted overlay, wherein the threshold value is different based on a type of a multi-part context descriptor selected and combinations of multi-part context descriptors, wherein the processor is configured to determine the reliability coefficient for the sub-images based on a similarity between the multi-part context descriptor for the sub-images and a preset multi-part context descriptor for the body parts, and wherein the multi-part context descriptor comprises a basic descriptor corresponding to the basic feature and an extension descriptor corresponding to the extension feature.

15. The apparatus of claim 1,
wherein the threshold value is different based on a combination of at least one basic descriptor and at least one extension description included in the multi-part context descriptor, and
wherein the processor is configured to calculate a mean center location and a mean center size of the sub-images having the reliability coefficient requirement higher than the threshold value and configured to use at least one of the mean center location and the mean center size to determine a final location of the body parts.

16. The apparatus of claim 15, wherein the processor is configured to weigh the mean center location and the mean center size based on a respective reliability coefficient to determine the final location of the body parts.

17. The apparatus of claim 14, wherein the processor is configured to search for a sub-image based on at least one of a predetermined location and size of a depth image, and to determine whether a sub-image identified in the search corresponds to the body parts in the image to be detected.

* * * * *